(12) United States Patent
Verplaetse et al.

(10) Patent No.: US 12,182,321 B2
(45) Date of Patent: Dec. 31, 2024

(54) ELECTRONIC DEVICES WITH PROJECTORS CONTROLLED BY VOICE INPUT

(71) Applicant: Apple Inc., Cupertino, CA (US)

(72) Inventors: Christopher J Verplaetse, San Francisco, CA (US); Clark D Della Silva, Truckee, CA (US); Felipe Bacim De Araujo E Silva, San Jose, CA (US); Stuart J Wood, London (GB)

( * ) Notice: Subject to any disclaimer, the term of this patent is extended or adjusted under 35 U.S.C. 154(b) by 0 days.

(21) Appl. No.: 18/346,659

(22) Filed: Jul. 3, 2023

(65) Prior Publication Data
US 2023/0409107 A1    Dec. 21, 2023

Related U.S. Application Data

(63) Continuation of application No. 17/842,690, filed on Jun. 16, 2022, now Pat. No. 11,740,689.

(51) Int. Cl.
*G06F 3/01* (2006.01)
*G06F 3/16* (2006.01)
*H05B 47/11* (2020.01)
*H05B 47/115* (2020.01)

(52) U.S. Cl.
CPC ............. *G06F 3/011* (2013.01); *G06F 3/017* (2013.01); *G06F 3/167* (2013.01); *H05B 47/11* (2020.01); *H05B 47/115* (2020.01)

(58) Field of Classification Search
CPC . G03B 17/54; G03B 33/06; G06F 2203/0381; G06F 2203/04104; G06F 3/011; G06F 3/017; G06F 3/0421; G06F 3/167; G06F 3/0425; G06F 3/043; G06F 3/012; G06F 3/0304; H04N 9/3182; H04N 9/3194; H04N 13/361; H04N 23/20; H05B 47/11; H05B 47/115; H05B 47/12; G09G 3/3266
See application file for complete search history.

(56) References Cited

U.S. PATENT DOCUMENTS

| | | |
|---|---|---|
| 9,030,445 B2 | 5/2015 | Shamaie |
| 9,047,514 B2 | 6/2015 | Vieth et al. |
| 9,329,469 B2 | 5/2016 | Benko et al. |
| 9,723,248 B1 | 8/2017 | Colburn et al. |
| 9,791,130 B2 | 10/2017 | Di Trapani |
| 10,133,171 B2 | 11/2018 | Grundhofer et al. |

(Continued)

*Primary Examiner* — Richard J Hong
(74) *Attorney, Agent, or Firm* — Treyz Law Group, P.C.; Kendall P. Woodruff

(57) ABSTRACT

An electronic device may include an ambient light sensor that measures ambient light color, a projector that projects ambient-light-matching illumination onto a surface, a user input device such as a microphone that gathers user input, and a position sensor that measures a position of the surface, a user, and/or a real-world object relative to the device. The ambient-light-matching illumination may create illuminated regions on the surface that blend in with the surrounding ambient light. Certain pixels in the projector may be turned off to create one or more unilluminated regions within the illuminated regions. The unilluminated regions may form apparent shadows. Control circuitry in the electronic device may adjust characteristics of the unilluminated regions by dynamically adjusting which pixels are turned off based on voice input, gesture input, and/or other sensor data.

19 Claims, 8 Drawing Sheets

(56) References Cited

U.S. PATENT DOCUMENTS

| | | |
|---|---|---|
| 10,924,651 B2 | 2/2021 | Chaudhri et al. |
| 11,368,674 B1* | 6/2022 | Huang ................. H04N 9/3194 |
| 2002/0186221 A1* | 12/2002 | Bell ....................... H04N 23/20 |
| | | 348/E5.029 |
| 2005/0219466 A1 | 10/2005 | Bissinger |
| 2008/0013826 A1 | 1/2008 | Hillis et al. |
| 2008/0316432 A1 | 12/2008 | Tejada |
| 2010/0289664 A1* | 11/2010 | Mizushima .......... H04N 9/3194 |
| | | 340/691.6 |
| 2011/0053688 A1 | 3/2011 | Crawford et al. |
| 2011/0305031 A1 | 12/2011 | Riedel et al. |
| 2013/0141434 A1 | 6/2013 | Sugden et al. |
| 2013/0229396 A1 | 9/2013 | Huebner |
| 2015/0009183 A1* | 1/2015 | Ling ..................... G06F 3/0304 |
| | | 345/175 |
| 2015/0138184 A1* | 5/2015 | Bilbrey ................ H04N 13/361 |
| | | 345/419 |
| 2016/0210738 A1 | 7/2016 | Curlander et al. |
| 2017/0249054 A1* | 8/2017 | Kang .................... G06F 3/0425 |
| 2018/0164878 A1* | 6/2018 | McGee ................... G06F 3/012 |
| 2019/0179476 A1* | 6/2019 | Strutt .................... G06F 3/043 |
| 2019/0258853 A1 | 8/2019 | Curlander et al. |

* cited by examiner

ELECTRONIC DEVICES WITH PROJECTORS CONTROLLED BY VOICE INPUT

This application is a continuation of patent application Ser. No. 17/842,690, filed Jun. 16, 2022, which is hereby incorporated by reference herein its entirety.

FIELD

This relates generally to electronic equipment, and, more particularly, to electronic devices with projectors.

BACKGROUND

Computers and other electronic devices may sometimes include displays. A display may present images to a user. With touch-sensitive displays, a user may interact with the images by providing touch input on the display.

Limitations may arise with traditional displays. For example, the user may wish to interact with real-world objects in the user's environment in addition to or instead of interacting with images on a display. Interacting with displayed images that have no connection to real-world objects may leave the user feeling removed from the user's real-world environment.

SUMMARY

An electronic device may include a projector for creating the appearance of animated shadows on a surface. The animated shadows may be created by projecting ambient-light-matching illumination onto the surface that blends in with the surrounding ambient light. Select pixels in the projector may be turned off so that one or more unilluminated regions are created within the surrounding illuminated region. The unilluminated regions may appear darker than the surrounding illuminated region, giving the appearance of a shadow. Characteristics of the shadow such as shape, size, and location may be adjusted by dynamically adjusting which pixels are turned off and which pixels are turned on to provide ambient-light-matching illumination.

The projector may be mounted in a housing such as a lamp housing, a furniture housing, a standalone projector housing, and/or any other suitable housing. The projector may be co-located with a position sensor that monitors positions of the surface, objects on the surface, a user or user's hands near the surface, and other objects. The position sensor may be an array of optical emitters and detectors, one or more cameras (e.g., visible light cameras, stereoscopic imaging systems, infrared cameras, depth sensing cameras, etc.), one or more ultrasonic sensors, and/or one or more radio-frequency sensors such as ultra-wideband radio-frequency sensors.

The electronic device may include an ambient light sensor for measuring ambient light color and a user input device such as a microphone configured to gather user input. A position sensor may also be used to gather user input such as gesture input (e.g., hand movements made near the surface, hand movements made with objects on the surface, hand movements made near the shadows, etc.). Control circuitry in the electronic device may adjust characteristics of the unilluminated regions based on voice input detected with the microphone, gesture input detected with the position sensor, and/or other sensor data.

DETAILED DESCRIPTION

Figure 1:
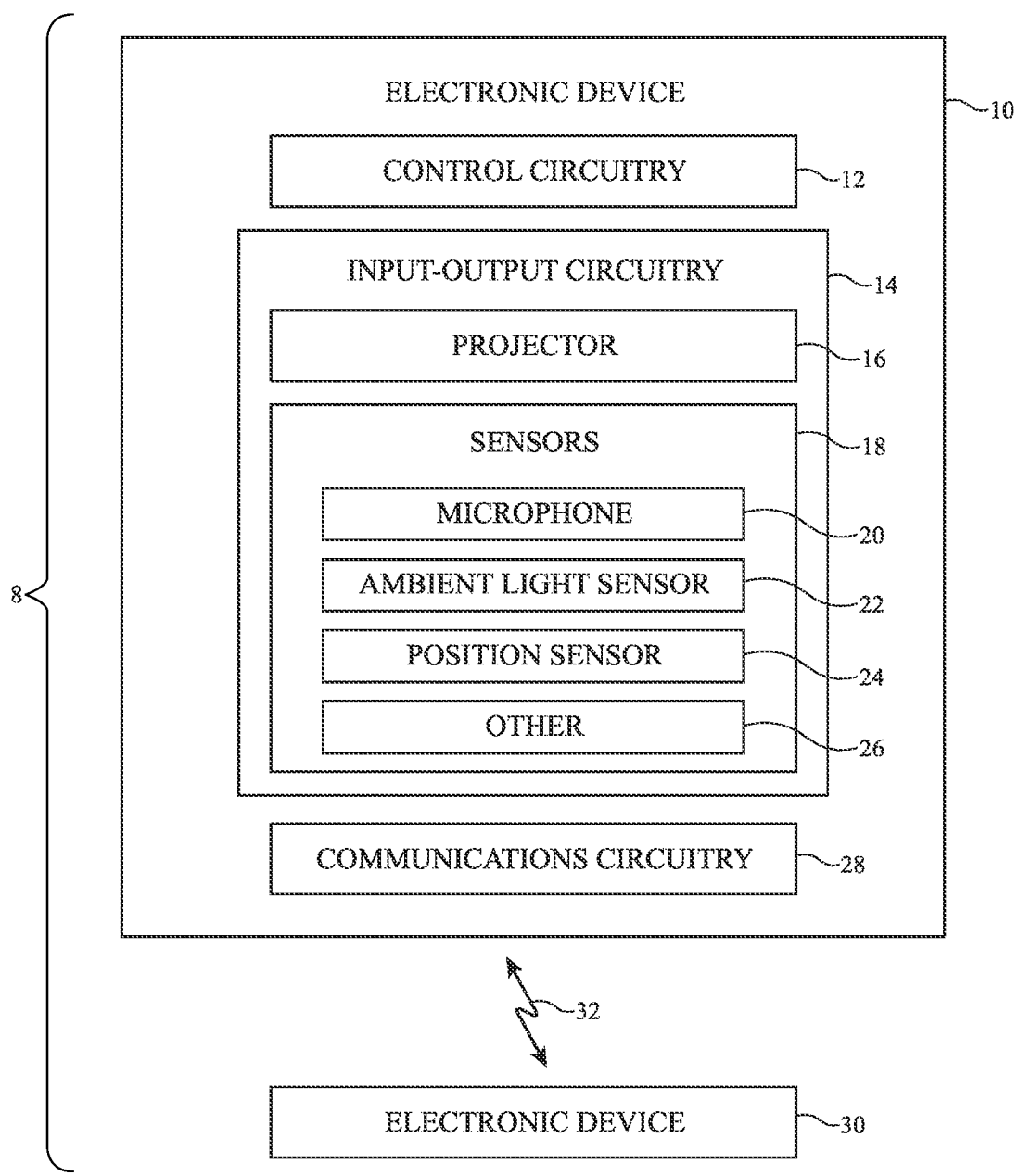
FIG. 1 is a schematic diagram of an illustrative system in accordance with an embodiment.

Electronic systems such as illustrative system 8 of FIG. 1 may include electronic devices such as electronic device 10 and one or more additional electronic devices such as electronic device 30. Device 10 and/or device 30 may be a stand-alone lamp, a mouse, trackpad, or other pointing device, a laptop computer, a computer monitor containing an embedded computer, a tablet computer, a cellular telephone, a media player, or other handheld or portable electronic device, a smaller device such as a wrist-watch device (e.g., a watch with a wrist strap), a pendant device, a headphone or earpiece device, a device embedded in eyeglasses or other head-mounted equipment worn on a user's head, or other wearable or miniature device, a computer display that does not contain an embedded computer, a gaming device, a navigation device, an embedded system such as a system in which electronic equipment with a display is mounted in a kiosk or automobile, a remote control, a voice-controlled internet-connected speaker (e.g., an artificial intelligence assistance device, home assistant, etc.), a set-top box, equipment that implements the functionality of two or more of these devices, electronic equipment embedded in lamps, tables, chairs, desks, other furniture, or other electronic equipment. Illustrative configurations in which device 10 is a lamp and device 30 is a portable electronic device such as a cellular telephone, tablet computer, or laptop computer may sometimes be described herein as an example. Other devices may be used in system 8, if desired.

As illustrated by communications link 32, device 10 may communicate with one or more additional devices such as device 30. Devices such as device 30 may be peer devices (e.g., additional devices such as device 10), may be accessories (e.g., speakers, headphones, displays, pointing devices, and/or other accessories that operate with device 10), and/or may be one or more electronic devices that are controlled by device 10 (e.g., a computer, television, display with an embedded computer, display without any embedded computer, set-top box, countertop digital assistant, and/or other electronic equipment). Links such as link 32 in system 8 may be wired or wireless communication links. Each device in system 8 such as device 10 may include communications circuitry such as communications circuitry 28 of device 10 for supporting communications over links such as link 32.

Communications circuitry 28 may include wired and wireless communications circuitry. Communications circuitry 28 in one device may be used to support communications over one or more wired or wireless communications links (e.g., link 32) with one or more additional devices (e.g., a peer device, a host, an accessory, etc.). Wireless circuitry in communications circuitry 28 may include one or more antennas and one or more radio-frequency transceiver circuits. Wireless communications circuitry may be used to support wireless communications over cellular telephone bands, wireless local area network bands, near field communications bands, etc.

Electronic devices in system 8 such as illustrative electronic device 10 may include control circuitry such as control circuitry 12. Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

Device 10 may include input-output circuitry 14 to allow data and other input to be supplied to device 10 and to allow data and other output to be provided from device 10 to a user and/or to external devices such as device 30. Input-output circuitry 14 may include input-output devices such as buttons, joysticks, scrolling wheels, touch pads, key pads, keyboards, microphones, speakers, tone generators, vibrators, cameras, displays and/or other light-emitting components, light-emitting diodes and other status indicators, data ports, etc.

Input-output circuitry 14 may include one or more image projectors such as projector 16 that projects images onto a surface (e.g., a surface on which device 10 is resting) or other surface in the environment surrounding device 10, may contain other types of display devices (e.g., a light-emitting diode display such as an organic light-emitting diode display, a liquid crystal display, an electrophoretic display, etc.), and/or may contain other output components. Projector 16 may be a liquid crystal display projector, a liquid crystal on silicon projector, a digital light processing projector, and/or a projector based on any other suitable technology. Projector 16 may have an array of pixels configured to project images onto a surface. The color of light emitted from the array of pixels in projector 16 may be tunable. For example, the white point of light emitted from projector 16 may be adjustable between a warm white, a cool white, and/or any other suitable white point. This allows the images produced by projector 16 to include ambient-light-matching illumination that blends in with the surrounding ambient light in the user's environment.

Control circuitry 12 may be configured to selectively turn off certain pixels within the array of projector 16 while other pixels in the array are turned on. Illuminated regions may be created where the pixels are turned on, and unilluminated regions may be created where the pixels are turned off. Because the illuminated regions are illuminated with light that blends in with the surrounding ambient light, the unilluminated regions will appear darker than the illuminated regions, thereby creating the appearance of shadows. Control circuitry 12 may selectively adjust the shape, location, size, movement, and other characteristics of the perceived shadows by adjusting where the illuminated and unilluminated regions are on the surface. For example, control circuitry 12 may adjust the perceived shadows based on user input (e.g., voice and/or speech input, gesture input, touch input, etc.), based on sensor data (e.g., sensor data indicating where and what objects are located on the surface, sensor data indicating where a user is and/or where the user's hands are, and/or other sensor data), and/or based on other information. Control circuitry 12 may adjust characteristics of the unilluminated regions by adjusting which pixels in projector 16 are turned off and which pixels are turned on to provide ambient-light-matching illumination.

Input-output circuitry 14 may include sensors such as sensors 18. Sensors 18 may include one or more microphones such as microphone 20 (e.g., for gathering voice input from a user), one or more ambient light sensors such as ambient light sensor 22 (e.g., a color-sensitive ambient light sensor that measures the brightness and/or color of ambient light), and one or more position sensors such as position sensor 24 (e.g., a depth sensor such as a structured light sensor and/or a depth sensor based on stereo imaging devices that capture three-dimensional images, an optical sensor such as a self-mixing interferometric optical sensor, a light detection and ranging (lidar) sensor that gathers time-of-flight measurements, and/or a position sensor based on one or more light-emitters and light detectors, one or more visible and/or infrared digital image sensors and lenses (e.g., cameras or other optical sensors that capture images of an environment that can be processed using image recognition techniques to detect and identify objects or people in the environment), one or more ultrasonic emitters and detectors, radio-frequency components such as ultra-wideband sensors, and/or any other suitable position and movement sensing technology) for measuring hand positions, three-dimensional hand gestures and finger gestures (e.g., non-contact gestures in the air and/or gestures on a surface), object positions, object movements, surface positions, and positions of other objects in the environment around device 10, and/or other sensors.

Sensors 18 in input-output circuitry 14 may include other sensors 26 such as force sensors (e.g., strain gauges, capacitive force sensors, resistive force sensors, etc.), touch and/or proximity sensors such as capacitive sensors (e.g., a two-dimensional capacitive touch sensor integrated into and/or overlapping a display, and/or a touch sensor that forms a button, trackpad, or other input device not associated with a display), optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, humidity sensors, moisture sensors, gaze tracking sensors, and/or other sensors. In some arrangements, device 10 may use sensors 18 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface (e.g., by measuring vibrations that pass to device 10 through a tabletop or other surface from a user's fingers) and may therefore be used to gather finger press input, etc.

Color ambient light sensor 22 for device 10 may have an array of detectors each of which is provided with a color filter. If desired, the detectors in ambient light sensor 22 may be provided with color filters of different respective colors. Information from the detectors may be used to measure the total amount of ambient light that is present in the vicinity of device 10. For example, the ambient light sensor may be used to determine whether device 10 is in a dark or bright environment. Based on this information, control circuitry 12 can adjust projector brightness or can take other suitable action.

Ambient light sensor 22 may be used to make ambient light intensity (e.g., brightness, illuminance, and/or luminance flux per unit area) measurements. Control circuitry 12 may use the ambient light intensity measurements, which may sometimes be referred to as ambient light illuminance measurements, to adjust brightness (as an example) of light from projector 16. Ambient light sensor 22 may be used to make measurements of ambient light color (e.g., color coordinates, correlated color temperature, or other color parameters representing ambient light color). Control circuitry 12 may convert these different types of color information to other formats, if desired (e.g., a set of red, green, and blue sensor output values may be converted into color chromaticity coordinates and/or may be processed to produce an associated correlated color temperature, etc.).

Color information and illuminance information from color ambient light sensor 22 can be used to adjust the operation of device 10. For example, the color temperature of illumination from projector 16 (e.g., the white point of light emitted from projector 16) may be adjusted in accordance with the color of ambient lighting conditions. If, for example, the environment in which device 10 is located shifts from a cool lighting condition (e.g., with cool daylight illumination coming through nearby windows) to a warm lighting condition (e.g., with mostly artificial lighting such as warm incandescent illumination), the warmth of light from projector 16 may be increased accordingly so that the color temperature of light emitted from projector 16 matches the color temperature of the ambient light. If desired, the ambient light sensor may include an infrared light sensor. In general, any suitable actions may be taken based on color measurements and/or total light intensity measurements (e.g., adjusting brightness, content, audio and/or video settings, sensor measurements from other sensors, which display options are presented to a user of device 10, wireless circuitry settings, etc.).

If desired, electronic device 10 may include additional components such as haptic output devices, audio output devices such as speakers, light-emitting diodes for status indicators, light sources such as light-emitting diodes that illuminate portions of a housing, other optical output devices, and/or other circuitry for gathering input and/or providing output. Device 10 may also include a battery or other energy storage device, connector ports for supporting wired communication with ancillary equipment and for receiving wired power, and other circuitry.

During operation, control circuitry 12 may use ambient light sensor 22 to detect current ambient light conditions such as the color and brightness of ambient light. Control circuitry 12 may use projector 16 to project images onto a surface using illumination that matches the color and brightness of the detected ambient light. The images may include illuminated regions and unilluminated regions (e.g., where pixels of projector 16 are turned off) within the illuminated regions. Because the illuminated regions are illuminated with light that blends in with the surrounding ambient light, the unilluminated regions will appear darker than the illuminated regions, thereby creating the appearance of shadows. Control circuitry 12 may use sensors 18 to gather user input and other sensor data and may adjust the projected images based on the user input and the sensor data. For example, control circuitry 12 may use microphone 20 to gather voice input and may use position sensor 24 to map out the environment (e.g., to map out the surface and any objects on the surface). Control circuitry 12 may use projector 16 to adjust the illuminated and unilluminated regions on the surface based on the user input and the environment mapping (e.g., to create the appearance of shadows based on what the user is saying, based on other user input, based on what hand gestures the user is making, based on what object(s) are on the surface, and/or based on other information).

Figure 2:
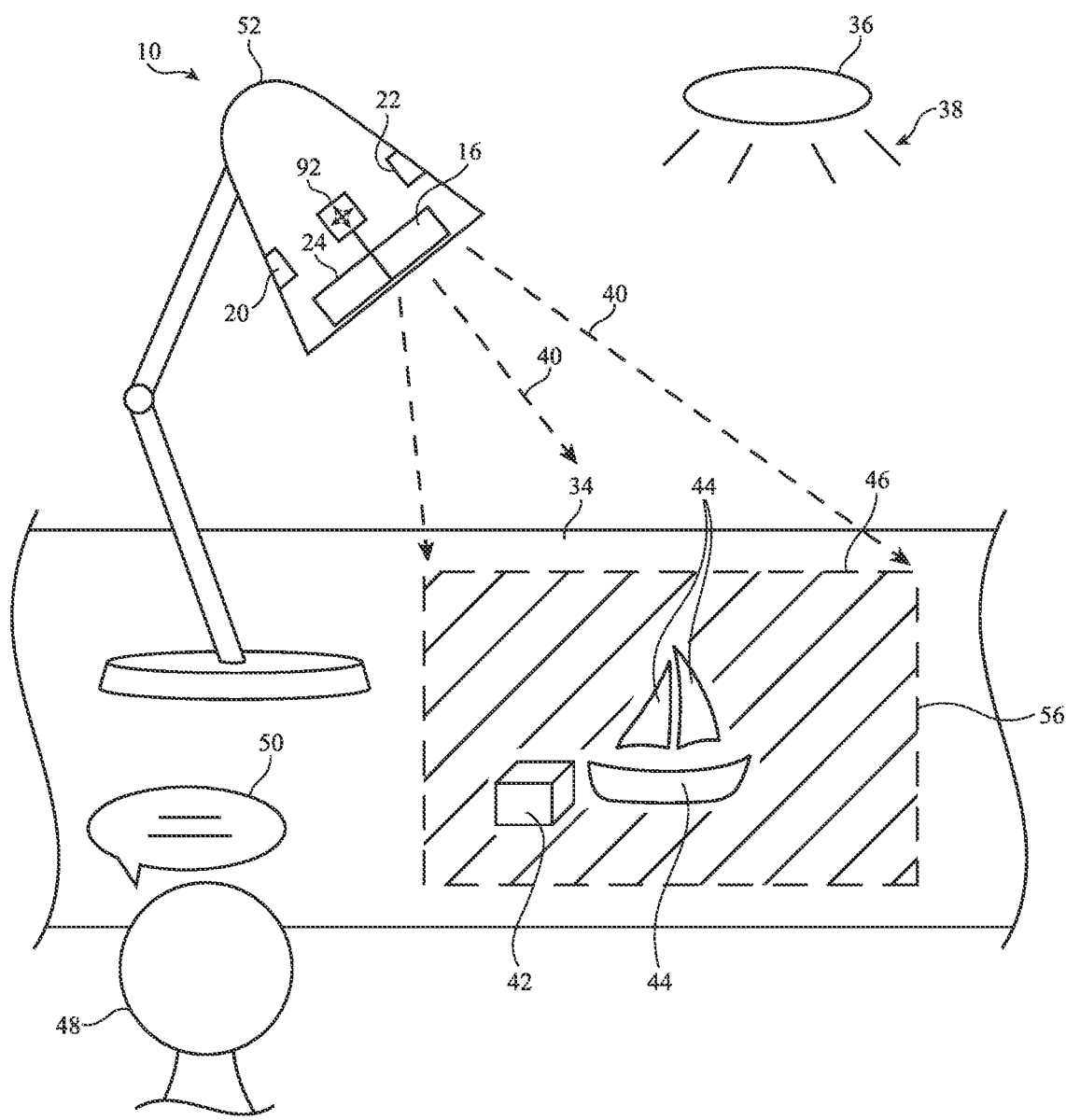
FIG. 2 is a perspective view of an illustrative electronic device with a projector in accordance with an embodiment.

FIG. 2 is a perspective view of an illustrative system that includes device 10. In the example of FIG. 2, device 10 is in the form of a lamp and may be used to illuminate a surface such as surface 34 (e.g., a table surface, a floor surface, a desk surface, a wall surface, etc.).

Device 10 may have a housing such as housing 52. Housing 52, which may sometimes be referred to as an enclosure or case, may be formed of plastic, glass, ceramics, fiber composites, metal (e.g., stainless steel, aluminum, etc.), fabric, wood or other natural materials, other suitable materials, or a combination of any two or more of these materials. Housing 52 may be formed using a unibody configuration in which some or all of housing 52 is machined or molded as a single structure or may be formed using multiple structures (e.g., an internal frame structure, one or more structures that form exterior housing surfaces, etc.). In the example of FIG. 2, housing 52 includes support structures for supporting a lamp such as a base configured to rest on a surface such as surface 34, a stand coupled to the base which may be configured to articulate around one or more rotational axes and/or along one or more linear axes, and a shade surrounding a light source such as projector 16 and/or other light source. The example of FIG. 2 in which device 10 forms a lamp is merely illustrative. If desired, device 10 may be a standalone projector device or may be embedded in a piece of furniture (e.g., a desk, a chair, a sofa, etc.), a wall, a cabinet, a ceiling, a thermostat, a refrigerator, an oven, a microwave, a wall lamp, a piece of electronic equipment (e.g., a receiver, speaker, television, gaming console, etc.), and/or any other suitable item.

Device 10 may include circuitry of the type described in connection with FIG. 1. As shown in FIG. 2, for example, device 10 may include input-output devices such as microphone one or more ambient light sensors such as ambient light sensor 22, one or more position sensors such as position sensor 24, and one or more projectors such as projector 16. Control circuitry 12 (not shown in FIG. 2) may also be included in device 10 and may be used to control projector 16 based on user input gathered from user input devices such as microphone 20, based on ambient light brightness and/or color measured using ambient light sensor 22, and based on sensor data from sensors such as position sensor 24. If desired, projector 16 and/or position sensor 24 may be coupled to one or more computer-controlled positioners 92 (e.g., an actuator, a motor, a pivoting and/or rotating support structure, etc.) so that control circuitry 12 can adjust the position of projector 16 and/or position sensor 24. For example, control circuitry 12 may adjust the position of projector 16 and/or position sensor 24 based on sensor data such as information from position sensor 24 indicating where user 48 is located, where object 42 is located, where surface 34 is located, and/or based on other sensor data.

During operation, control circuitry 12 may use ambient light sensor 22 to gather ambient light measurements. Light sensor 22 may be formed from an integrated circuit (e.g., a silicon integrated circuit) and/or discrete light detecting components. In some arrangements, light sensor 22 may be a single-channel broadband photodetector (e.g., a photodiode) that detects light across the visible spectrum. In other arrangements, light sensor 22 may include multiple photodetectors to discriminate between different colors. For example, light detector 22 may have multiple photodetectors each of which gathers and measures light in a different band of wavelengths. These bands of wavelengths, which may sometimes be referred to as channels or color channels, may overlap slightly with each other and may, if desired, provide continuous coverage of the visible light spectrum (and, if desired, portions of the infrared light spectrum and/or ultraviolet light spectrum). Each photodetector may be overlapped by a corresponding thin-film interference filter with a desired light transmission spectrum and/or may be overlapped by a color filter formed from a layer of dye or pigment with a desired light transmission spectrum. The light transmission spectrum of each color filter may correspond to a band of wavelengths at a different location of the visible light spectrum or other desired portion of the light spectrum. For example, a red channel photodetector may have a color filter that passes red light wavelengths while blocking all other wavelengths. If desired, ultraviolet light sensitivity and/or infrared light sensitivity can be provided by incorporating ultraviolet and/or infrared channels into light detectors. Arrangements in which light sensor 22 is used to make visible light measurements are sometimes described herein as an example.

In configurations in which light sensor 22 is formed from an integrated circuit, photodetectors for different color channels can be distributed throughout the integrated circuit and, if desired, redundant photodetectors (e.g., photodetectors measuring the same color of light) may be included in light sensor 22. As an example, photodetectors in sensor 22 may include photodetectors for three or more different color channels and each color channel may have one or more different individual photodetectors for gathering a light measurement for that color channel. Supporting circuitry (e.g., switching circuitry, amplifier circuitry, analog-to-digital conversion circuitry, communications circuitry for supporting communications with control circuitry elsewhere in device 10, etc.) may be incorporated into an integrated circuit that contains the photodetectors or, if desired, some or all of this supporting circuitry for the photodetectors may be formed in one or more integrated circuits that are separate from the photodetectors. The sensor reading produced by sensor 22 may be processed by control circuitry 12 and converted into a color value. The color value can be represented in any suitable format. For example, a color value may be represented using color coordinates, a color temperature, color values in a color space (e.g., CIELAB color space, XYZ color space, RGB color space, etc.), a correlated color temperature, spectral information (e.g., a visible light spectral information, infrared light spectral information, and/or ultraviolet spectral information).

Control circuitry 12 may gather ambient light sensor data from color ambient light sensor 22 to adaptively determine how to adjust light 40 from projector 16 and display colors based on ambient lighting conditions. If desired, control circuitry 12 may control projector 16 using other information such as time information from a clock, calendar, and/or other time source, location information from location detection circuitry (e.g., Global Positioning System receiver circuitry, IEEE 802.11 transceiver circuitry, or other location detection circuitry), user input information from a user input device such as a touchscreen or keyboard, etc.

Ambient light sensor 22 may be used to measure the color and intensity of ambient light 38 from light source 36. Light source 36 may include one or more artificial light sources, may include the sun, and/or may include a combination of artificial and natural light sources. Control circuitry 12 may adjust the operation of projector 16 based on the color and intensity of ambient light. If, for example, device 10 is located in a cool lighting environment (e.g., when ambient light 38 includes outdoor light having a relatively high correlated color temperature), projector light 40 may be cool (e.g., may have a white point with a higher color temperature) to blend in with the surrounding cool ambient light 38. If device 10 is located in a warm lighting environment (e.g., when ambient light 38 includes indoor light having a relatively low correlated color temperature), projector light 40 may be warm (e.g., may have a white point with a lower color temperature) to blend in with the surrounding warm ambient light 38.

The ability to produce illumination 40 that matches the color (and intensity, if desired) of ambient light 38 allows device 10 to create the appearance of shadows on surfaces such as surface 34 by creating selectively unilluminated regions (where certain pixels of projector 16 are turned off). For example, as shown in FIG. 2, device 10 may project ambient-light-matching illumination 40 onto surface 34 to create illuminated regions 46. Where pixels of projector 16 are temporarily inactive or turned off, unilluminated regions such as regions 44 may be created on surface 34. Illuminated regions 46 may be illuminated with the same color of light as ambient light 38 so that illuminated regions 46 blend in with surrounding ambient-illuminated areas such as portions of surface 34 that are outside of projection area 56. Because projector-illuminated regions 46 blend in with surrounding ambient-illuminated regions outside of projector area 56, unilluminated regions 44 on surface 34 may appear darker than illuminated regions 46 and may therefore appear as shadows for user 48. Unilluminated regions 44 may be partially or entirely surrounded by illuminated regions 46.

Control circuitry 12 may dynamically adjust which pixels of projector 16 are turned off and which pixels of projector 16 are turned on to adjust the shape, size, and location of unilluminated regions 44 and thereby give unilluminated regions 44 (sometimes referred to as shadows or apparent shadows) an animation effect. Shadows 44 may be used to present any suitable image such as images of objects (e.g., a boat, a battleship, a human, a bear, a shark, and/or any other suitable object), text, symbols, alphanumeric characters, moving images, patterns, rain effects, snow effects, mountains, ocean, buildings, floor plans, video game characters, movie or television characters, game pieces, game boards, and/or any other suitable image. If desired, one or more characteristics of unilluminated region 44 within surrounding illuminated region 46 may be adjusted without changing the overall location or size of projection area 56 (e.g., by adjusting which pixels in projector 46 are turned on and which pixels are turned off). In other arrangements, the entire projection area 56 may move (e.g., by moving projector 16 with positioner 92).

If desired, control circuitry 12 may control projector 16 based on real-word objects on surface 34 such as real-word object 42. This may include, for example, using position sensor 24 (e.g., an array of optical emitters and detectors, a camera, a depth sensor, an ultrasonic sensor, a radio-frequency sensor, and/or any other suitable position sensor) to determine the location of object 42 on surface 34, to determine the shape and size of object 42, and/or to detect visual markers and/or features on object 42 which may in turn be used to identify what and where object 42 is. Control circuitry 12 may adjust illuminated regions 46 and unilluminated regions 44 based on information about object 42 gathered with position sensor 24. For example, the edges of unilluminated regions 44 may be aligned with edges of real-world objects such as object 42, so that the shadow appears to be created by object 42. The shadow created by unilluminated regions 44 may have the same shape as object 42 or may have a different shape. As examples, object 42 may be a cube, a building block, an action figure, a game piece, a pen, pencil, stylus, or other writing utensil, a kitchen knife, or any other suitable real-world object, and the shadow 44 that is apparently "cast" by object 42 may have a sail boat shape, a building shape, a tree shape, or any other suitable shape. If desired, shadow 44 may be an animated version of object 42 (e.g., object 42 may be a toy doll and shadow 44 may be dancing version of the toy doll; object 42 may be a toy sail boat and unilluminated regions 44 may be a moving version of the toy sail boat with a billowing sail; object 42 may be an action figure and unilluminated regions 44 may be a fighting version of the action figure; etc.

Control circuitry 12 may adjust illuminated regions 46 and unilluminated regions 44 based on user input such as voice input 50 detected by microphone 20. For example, if user 48 is playing a game on surface 34 and is speaking during the game, microphone 20 may detect the user's voice 50 and control circuitry 12 may use speech recognition techniques to determine what user 48 is saying. If voice input 50 indicates that user 48 is building a battleship, control circuitry 12 may use projector 16 to create a battleship shadow using unilluminated regions 44. If voice input 50 indicates that user 48 is reading a recipe, control circuitry 12 may use projector 16 to display cooking instructions using unilluminated regions 44. These examples are merely illustrative. In general, voice input 50 may include any suitable content and unilluminated regions 44 may be adjusted to represent the content and/or may otherwise be adjusted based on the content of voice input 50. Control circuitry 12 may dynamically adjust characteristics of the unilluminated regions by adjusting which pixels in projector 16 are turned off and which pixels are turned on to provide ambient-light-matching illumination 40.

If desired, other types of user input such as gesture input and/or touch input may be used to adjust projector output. For example, position sensor 24 may be used to monitor the position of user 48 and/or the position of the user's hands using optical sensors, capacitive sensors, acoustic sensors, radio-frequency sensors, and/or other sensors for measuring finger position and/or the position of other user body parts. Position sensor 24 may be used to detect hand gestures that are intentionally user input gestures (e.g., swipe gestures, pinch-to-zoom gestures, tap gestures, hand wave gestures, etc.) as well as hand gestures that may not be intentional user input gestures such as a user picking up object 42, placing object 42 on surface 34, moving object 42 around, hand gestures that do not involve object 42, etc.

As an example, user 48 may move the user's finger to move a cursor, to select an item in a list, to highlight an item, to drag and drop items, to launch an item, and/or to otherwise interact with unilluminated regions 44. User input may include finger taps (single taps, double taps, triple taps, gestures formed from lingering finger positions (hovers, persistent finger presence in a particular location on surface 34), single-finger swipes, multi-finger swipes, pinch-to-zoom gestures and other multi-touch finger gestures, hand gestures, other two-dimensional and three-dimensional gestures (e.g., waving a user's hand and fingers in the air near sensor 24, etc.), and/or any other suitable user input from a user body part, stylus controlled by a user, and/or other external objects. User input may include user finger movements on surface 34 and/or above surface 34 or other locations in the air near device 10.

Control circuitry 12 may adjust projector output based on the user gestures detected with position sensor 24 (e.g., by changing shadow 44 from a sail boat to a truck in response to an intentional swipe gesture near shadow 44, by moving shadow 44 to a different location in response to a hold-and-drag gesture near shadow 44, etc.). If desired, both voice input, gesture input, and sensor data about object 42 may be used to adjust projector output. For example, sensor data may indicate that object 42 is a toy boat, voice input 50 may indicate that user 48 imagining a storm approaching, and gesture input may indicate that user 48 is rocking object 42 up and down. In response to this voice input, gesture input, and sensor data, control circuitry 12 may adjust projector output from projector 16 to create the appearance of choppy water, rain, and clouds in region 46 using unilluminated regions 44.

Figure 3:
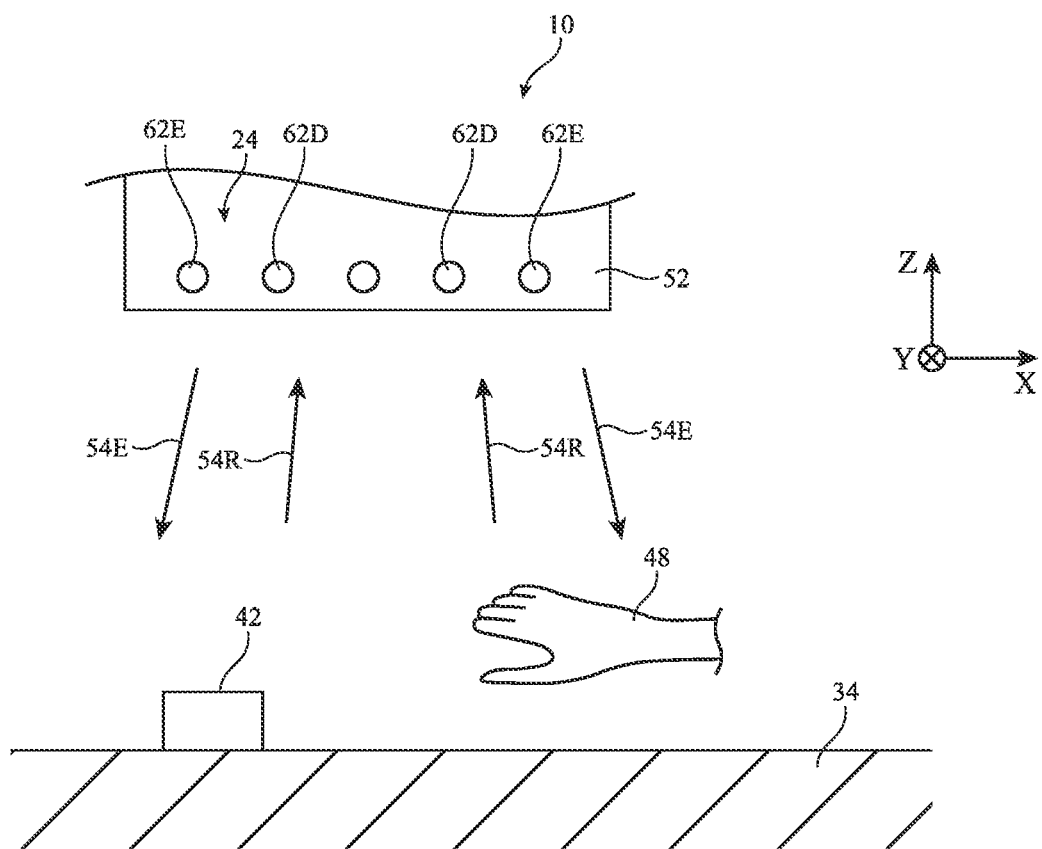
FIG. 3 is a side view of an illustrative electronic device with one or more optical position sensors in accordance with an embodiment.

FIG. 3 is a side view of a portion of device 10 in an illustrative configuration in which sensor 24 includes optical sensors. There may be an array of sensors 24 (e.g., a one-dimensional or two-dimensional array) extending along one or more surfaces of housing 52. Each sensor 24 may include a light-emitting device 62E such as a light-emitting diode or laser and may include a corresponding light detector 62D (e.g., a photodiode, etc.). If desired, sensors 24 may include different numbers of light-emitting devices and light detectors.

During operation, some of the emitted light rays from sensors 24 may be reflected from the fingers of a user such as user 48. As an example, a user may place the user's finger on or near surface 34. Due to the presence of the user's finger, an emitted light ray such as light ray 54E will reflect from the finger as reflected ray 54R. Reflected ray 54R may be detected by a detector 62D in one or more of sensors 24 and this reflected signal information may be processed to determine the location of the user's finger. For example, the location of the user's finger (e.g., in x, y, and z coordinates) on or above surface 34 in the example of FIG. 3 may be determined by analyzing which light rays are reflected, analyzing the intensity of reflected light, etc. Similarly, an emitted light ray 54E may reflect from the real-word objects on surface 34 such as real-world object 42 as reflected ray 54R. Reflected ray 54R may be detected by a detector 62D in one or more of sensors 24 and this reflected signal information may be processed to determine the location of object 42. If desired, different light-emitting diodes or lasers in sensors 24 may be modulated with different patterns (e.g., different frequencies, different digital codes, etc.) to help identify the source of reflected light and thereby help identify the location of the user's fingers and/or object 42. If desired, sensors 24 may be configured to emit light rays 54E in a pattern in which some rays are angled in different directions. This may help device 10 identify the location of the user's fingers and/or object 42.

Figure 4:
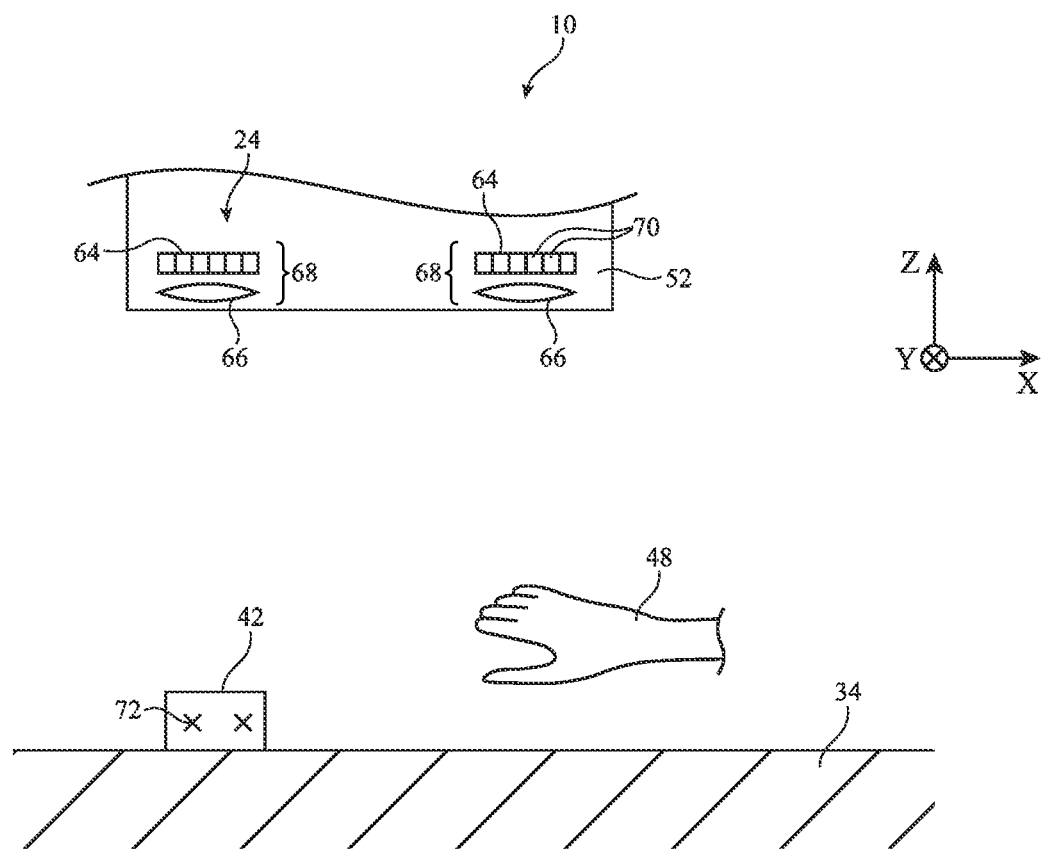
FIG. 4 is a side view of an illustrative electronic device with one or more position sensors based on image sensor components in accordance with an embodiment.

As shown in the example of FIG. 4, position sensor 24 may include one or more optical sensors such as cameras 68 for monitoring finger position. Each camera 68 may have a digital image sensor 64 with an array of sensor pixels 70. Each camera 68 may also have an optical system such as lens 66. Lens 66 may contain one or more lens elements and may be used to focus images of the hands of user 48 and/or object 42 onto a corresponding image sensor 64. Image sensors 64 may be sensitive to visible light (e.g., cameras 68 may be visible light cameras) and/or may be sensitive to infrared light (e.g., cameras 68 may be infrared cameras).

Images of the hands of user 48 and/or object 42 that are taken with two or more cameras 68 may be stereoscopic. Accordingly, images taken of the hands of user 48 and/or object 42 may be used in identifying the location of the hands of user 48 and/or object 42 in three-dimensional space. Three-dimensional finger imaging using cameras 68 may be used to capture three-dimensional gestures with the user's hands and fingers (e.g., air gestures such as waves, etc.).

In some arrangements, object 42 may include visual markers such as visual markers 72. If desired, sensors such as cameras 68 or other sensors on housing 52 of device 10 may be used to monitor the position of visual markers 72. Marker 72 may be a passive symbol (e.g., a crosshair-shaped symbol or other visually recognizable symbol) and/or may include one or more light sources such as light-emitting diodes or lasers (e.g., light-emitting devices organized in a recognizable asymmetric pattern to facilitate detection by cameras 68 and/or light-emitting devices that each emit light that is modulated with a different respective modulation scheme). Based on information from cameras 68, control circuitry 12 can determine the location of object 42.

Figure 5:
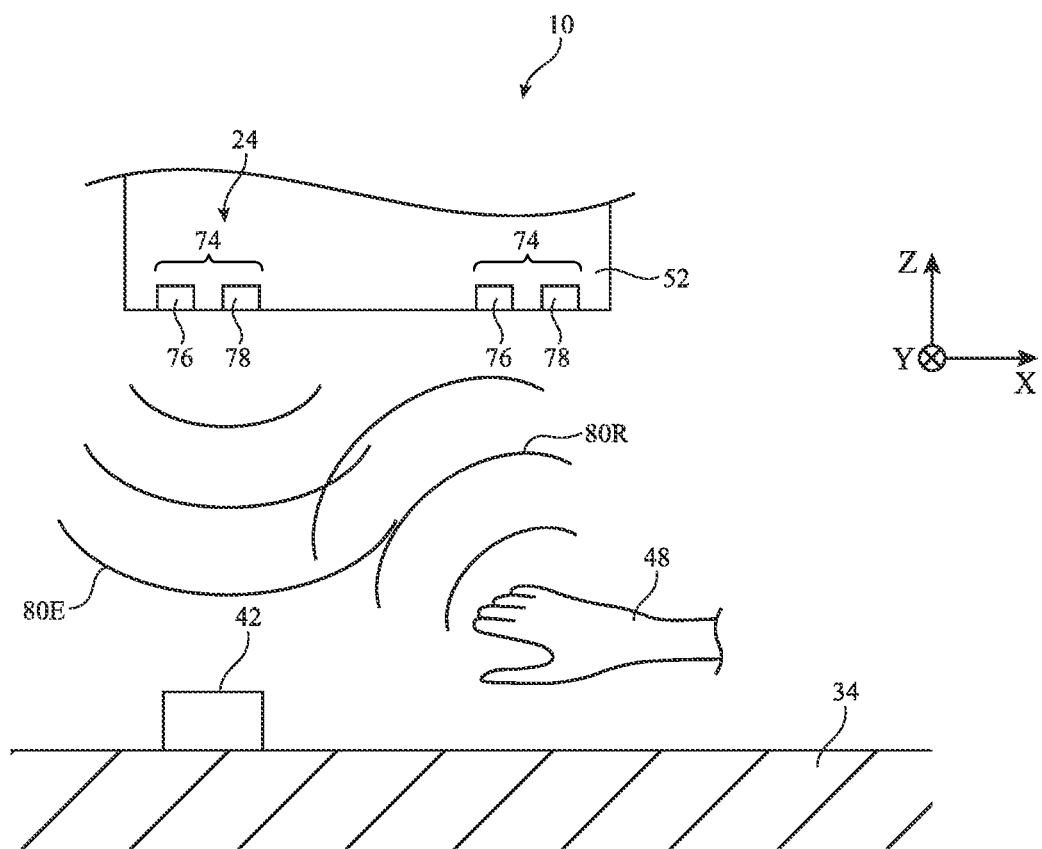
FIG. 5 is a side view of an illustrative electronic device with one or more ultrasonic position sensors in accordance with an embodiment.

As shown in FIG. 5, position sensor 24 may include ultrasonic sensors 74 that measure the position of the hands of user 48 and/or object 42. Each ultrasonic sensor 74 may include an ultrasonic sound transmitter 76 (e.g., an ultrasonic transducer) and a microphone or other ultrasonic sound detector 78. During operation, transmitted ultrasonic signals 80E may reflect off of the hands of user 48 and/or object 42 as shown by reflected signals 80R and may be detected by ultrasonic sound detectors (microphones) 78. Time-of-flight techniques (e.g., echolocation techniques), and/or other ultrasonic sensor positioning techniques may be used by device 10 to measure the positions of the hands of user 48 and/or object 42.

Figure 6:
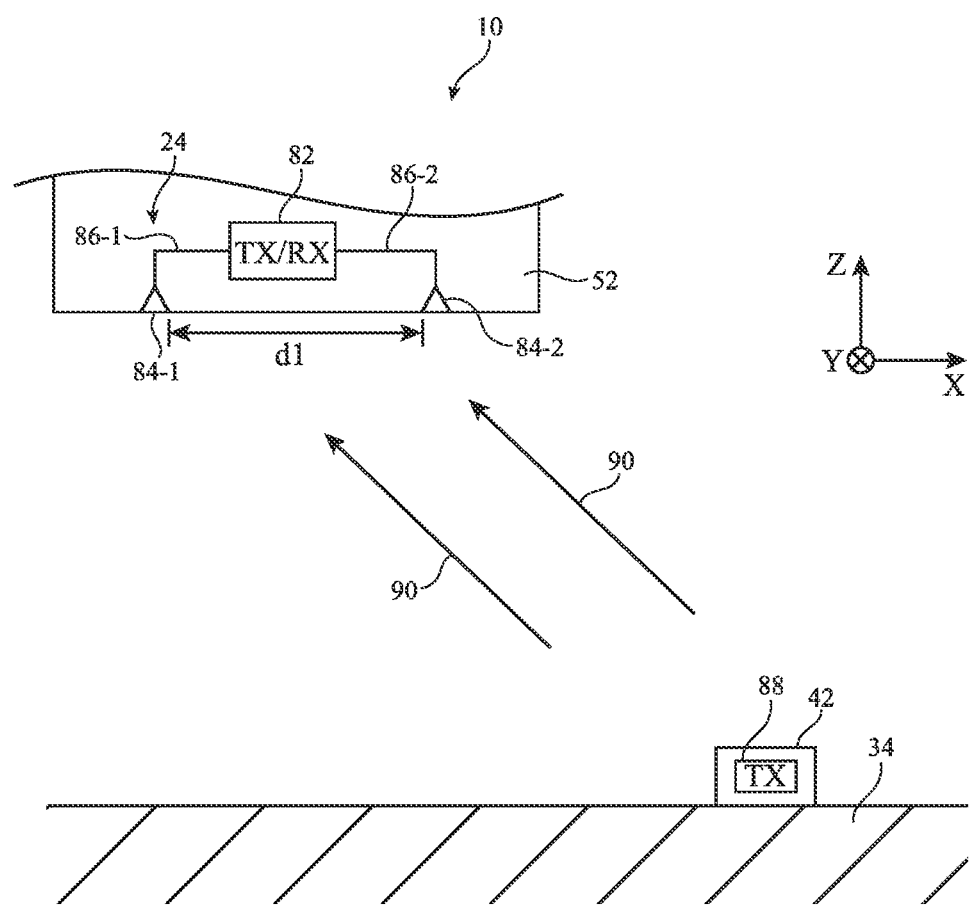
FIG. 6 is a side view of an illustrative electronic device with one or more position sensors based on radio-frequency components in accordance with an embodiment.

As shown in FIG. 6, position sensor 24 may include a radio-frequency sensor such as an ultra-wideband radio-frequency sensor that uses angle of arrival measurement techniques to determine the location of objects such as object 42. Object 42 may, in some arrangements, include a transmitter such as transmitter 88. As shown in FIG. 6, electronic device 10 may include multiple antennas (e.g., a first antenna 84-1 and a second antenna 84-2) coupled to transceiver circuitry 82 by respective transmission lines such as first transmission line 86-1 and a second transmission line 86-2. Antennas 84-1 and 84-2 may each receive a wireless signal 90 from transmitter 88 of object 42. Antennas 84-1 and 84-2 may be laterally separated by a distance dl, where antenna 84-1 is farther away from object 42 than antenna 84-2 (in the example of FIG. 6). Therefore, wireless communications signal 90 travels a greater distance to reach antenna 84-1 than 84-2. The additional distance between object 42 and antenna 84-1 may be determined as a function of the phase difference between the signal received by antenna 84-1 and the signal received by antenna 84-2. Electronic device 10 may have phase measurement circuitry coupled to each antenna to measure the phase of the received signals and identify a difference in the phases. The angle of arrival may be determined (e.g., by control circuitry 12) based on the known (predetermined) distance between antennas 84-1 and 84-2, the detected (measured) phase difference between the signal received by antenna 84-1 and the signal received by antenna 84-2, and the known wavelength or frequency of the received signals 90. Control circuitry 12 may determine the location of object 42 based on the angle of arrival of signals 90 and may adjust projector output from projector 16 (e.g., may adjust the location, shape, size, etc. of shadows formed by unilluminated regions 44) based on the location.

Distance dl may be selected to ease the calculation for phase difference between the signal received by antenna 84-1 and the signal received by antenna 84-2. For example, dl may be less than or equal to one half of the wavelength (e.g., effective wavelength) of the received signal 90 (e.g., to avoid multiple phase difference solutions).

Figure 7:
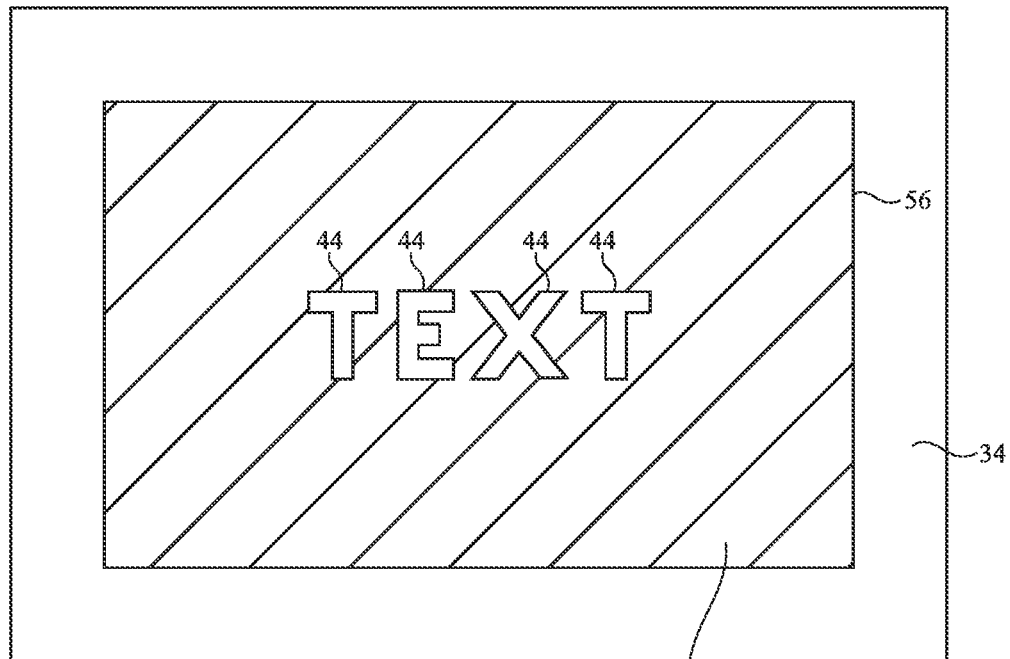
FIG. 7 is a top view of a surface on which ambient-light-matching illumination is projected to create unilluminated regions with text shapes in accordance with an embodiment.

FIG. 7 is a top view of illustrative images that may be displayed on a surface using device 10. Regions 46 of surface 34 are illuminated by projector 16 using ambient-light-matching illumination 40 (FIG. 2), and regions 44 are unilluminated by projector 16 (where pixels of projector 16 are turned off), thus appearing as darker shadows. The shadows formed by unilluminated regions 44 may be located adjacent to a real-world object (e.g., to appear as shadows that are cast by the real-world object) or may be standalone shadows that are not directly adjacent to a real-world object.

In the example of FIG. 7, unilluminated regions 44 form text on surface 34. The text formed by unilluminated regions 44 may be still (not moving) text, or may be moving text that moves across surface 34. Text formed by shadows 44 may be visual feedback to a user's voice or gesture input, may be cooking instructions on a cutting board where a user is chopping, may be a definition of a word that the user has requested, may be a narration from a character, and/or may be any other suitable text.

Figure 8:
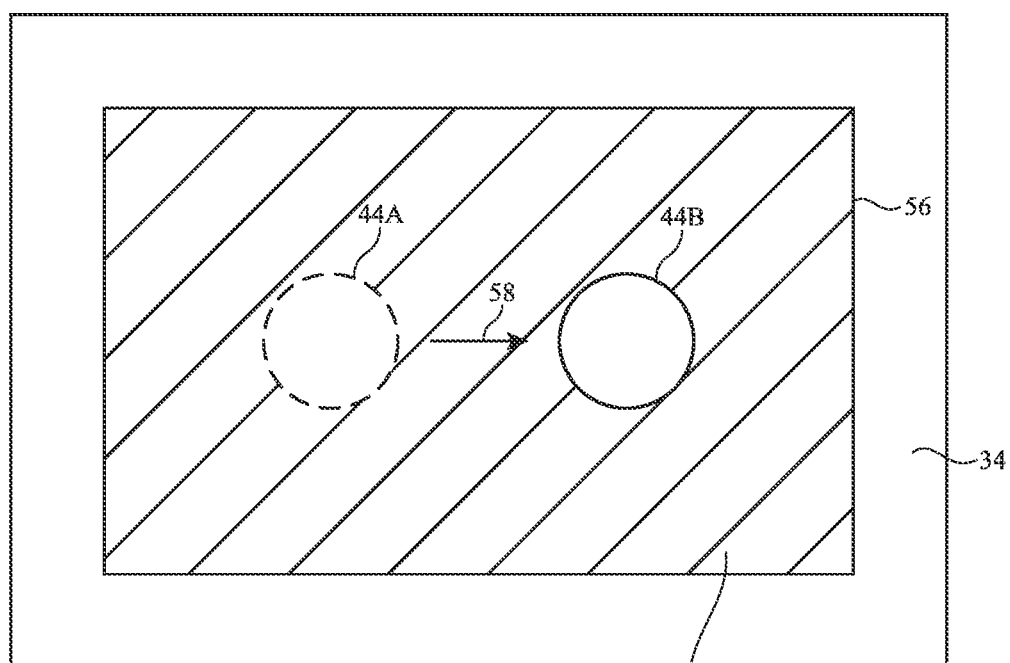
FIG. 8 is a top view of a surface on which ambient-light-matching illumination is projected to create unilluminated regions with moving object shapes in accordance with an embodiment.

In the example of FIG. 8, projector output is being used to create moving shadows. For example, the shadow formed by unilluminated regions of surface 34 may move in direction 58 from a first location on surface 34 (shadow 44A) to a second location on surface 34 (shadow 44B). The image formed by unilluminated regions 44 may be moving text, moving objects, moving effects, and/or any other suitable moving image. Control circuitry 12 may create moving unilluminated regions 44 by dynamically adjusting which pixels in projector 16 are turned off and which pixels are turned on to provide ambient-light-matching illumination.

Figure 9:
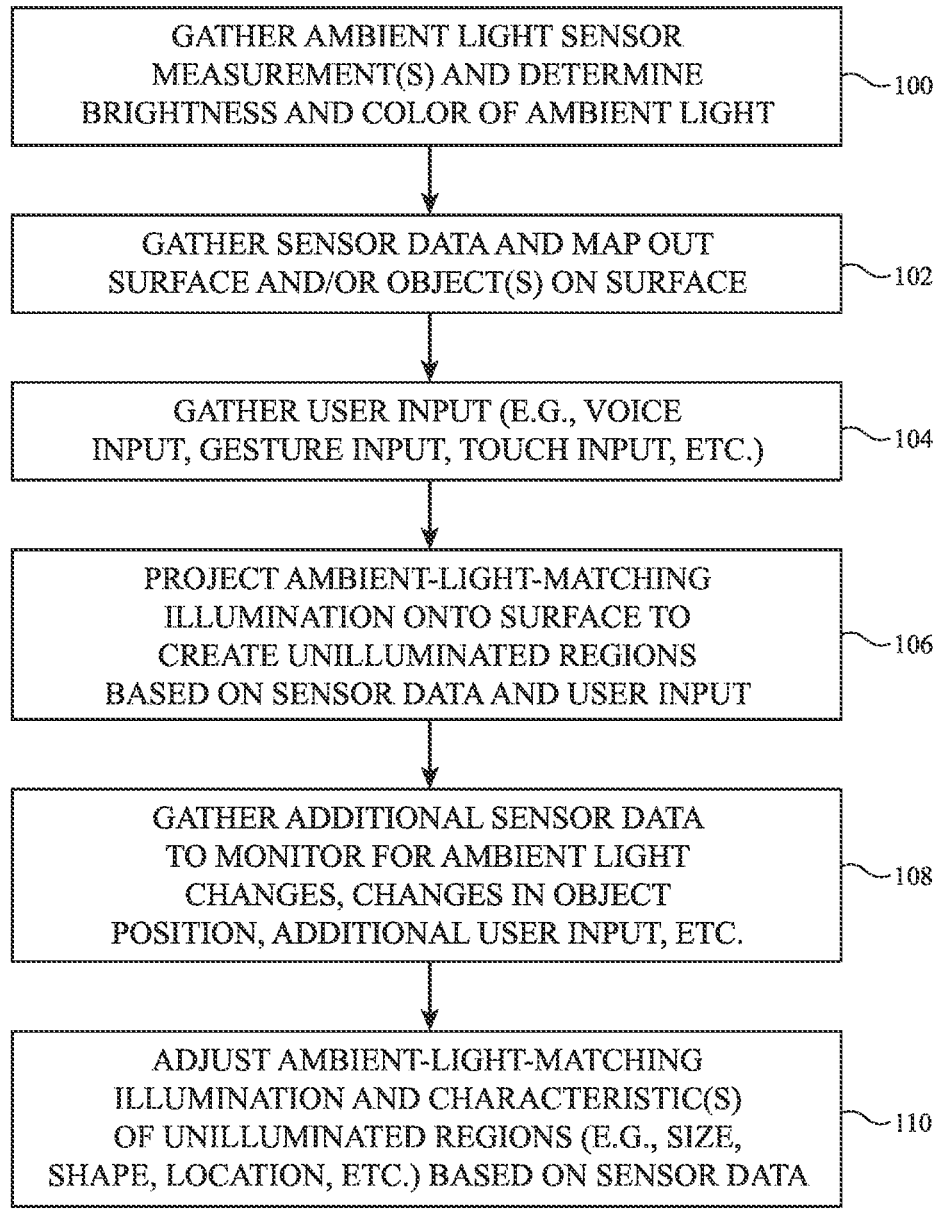
FIG. 9 is a flow chart of illustrative steps involved in operating an electronic device with a projector that projects ambient-light-matching illumination onto a surface in accordance with an embodiment.

FIG. 9 is a flow chart of illustrative steps involved in operating device 10 to produce the appearance of shadows (e.g., animated shadows) on a surface.

During the operations of block 100, control circuitry 12 may use ambient light sensor 22 to gather an ambient light sensor measurement. The ambient light sensor measurement may indicate a color and brightness of ambient light such as ambient light 38 of FIG. 2.

During the operations of block 102, control circuitry 12 may use one or more sensors such as position sensor 24 to determine the location of surface 34 relative to device 10 (e.g., relative to sensor 24), the location of real-world objects such as object 42 relative to device 10, the location of user 48 and/or a body part of user 48 such as the hands, and/or the location of other objects in the environment.

During the operations of block 104, control circuitry 12 may gather user input. For example, control circuitry 12 may use microphone 20 to gather voice input from a user and/or may use position sensor 24 and/or other sensors to detect touch input on surface 34 and/or three-dimensional finger gesture input in the air above surface 34. The user input may be intentional user input (e.g., designated hand gestures or voice commands) and/or unintentional user input (e.g., natural hand movements and/or natural conversational speech).

During the operations of block 106, control circuitry 12 may use projector 16 to provide projector output based on the sensor data and user input gathered during the operations of blocks 100, 102, and 104. For example, projector 16 may produce ambient-light-matching illumination having a color and/or brightness that matches the color and/or brightness of ambient light 38 measured in step 100. As an example, if ambient light sensor 22 detects ambient light 38 with a color temperature of 3000 K, projector illumination 40 may also have a color temperature of 3000 K. Some of the pixels within the pixel array of projector 16 may be turned off while other pixels are turned on so that unilluminated regions 44 are created within the surrounding illuminated regions 46. The characteristics of illuminated regions 46 and unilluminated regions 44 that are created by ambient-light-matching illumination 40 may be based on the sensor data gathered during step 102 (e.g., based on the location of surface 34 relative to device 10, the location of object 42 relative to device 10, and/or the location of user 48 relative to device 10) and/or may be based on the user input gathered during step 104 (e.g., based on the voice input detected by microphone 20 and/or the touch input or gesture input detected by position sensor 24).

During the operations of block 108, control circuitry 12 may gather additional sensor data to monitor for changes in ambient light color, to monitor for changes in position of object 42, user 48, or surface 34 relative to device 10, and/or to monitor for additional user input. For example, control circuitry 12 may gather additional ambient light sensor measurements from ambient light sensor 22, additional user input from sensors such as microphone 20, position sensor 24, and/or other user input devices, and additional sensor data from position sensor 24. Control circuitry 12 may analyze the additional sensor data to determine whether and how to update projector output from projector 16.

During the operations of block 110, control circuitry 12 may adjust projector output as needed based on the additional sensor data gathered during step 108. For example, the color temperature of projector illumination 40 may be adjusted to match any changes in ambient light color, the position of shadows 44 may be updated based on where object 42 or user 48 is located, the shape or shapes produced by shadows 44 may be changed based on user input, and/or any other characteristic of illuminated regions 46 and unilluminated regions 44 may be adjusted based on data gathered during step 108. Control circuitry 12 may dynamically adjust characteristics of shadows 44 by adjusting which pixels in projector 16 are turned off and which pixels are turned on to provide ambient-light-matching illumination.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
    a microphone configured to gather speech input;
    an optical position sensor configured to measure a position of a surface relative to the optical position sensor;
    a light sensor configured to measure color; and
    a projector configured to project illumination onto the surface, wherein a shape of the illumination is based on the speech input and a color of the illumination is based on the measured color.

2. The electronic device defined in claim 1 wherein the optical position sensor is configured to measure hand gestures and wherein the shape of the illumination is adjusted based on the hand gestures.

3. The electronic device defined in claim 1 wherein the optical position sensor comprises an array of infrared light emitters and an infrared camera.

4. The electronic device defined in claim 1 further comprising a voice-controlled internet-connected speaker.

5. The electronic device defined in claim 1 wherein the optical position sensor comprises a stereoscopic imaging system.

6. The electronic device defined in claim 1 wherein the illumination forms at least one of: text and a moving object.

7. The electronic device defined in claim 1 wherein the light sensor comprises an ambient light sensor and the color comprises an ambient light color.

8. The electronic device defined in claim 7 wherein the color of the illumination blends in with the ambient light color.

9. The electronic device defined in claim 1 wherein the optical sensor comprises a camera configured to capture images of an object in an environment, the electronic device further comprising control circuitry configured to process the images using image recognition techniques to identify the object in the environment.

10. An electronic device, comprising:
    a light sensor configured to measure color of ambient light;
    a microphone configured to detect voice input; and
    a projector configured to project illumination onto a surface in response to the voice input, wherein the illumination includes text and has a color that matches the measured color of the ambient light.

11. The electronic device defined in claim 10 further comprising:
    a camera configured to capture images of an environment; and
    control circuitry configured to process the images to identify an object in the environment.

12. The electronic device defined in claim 11 wherein the illumination is adjusted in response to identifying the object in the environment.

13. The electronic device defined in claim 12 further comprising a voice-controlled internet-connected speaker.

14. The electronic device defined in claim 10 wherein the light sensor comprises an ambient light sensor and wherein the illumination comprises ambient-light-matching illumination.

15. An electronic device, comprising:
    a light sensor configured to measure color;
    a depth sensor configured to detect hand gestures and a position of a surface;
    a microphone configured to detect conversational speech; and
    a projector configured to project illumination onto the surface based on the hand gestures and the conversational speech, wherein the illumination has a color that is based on the measured color.

16. The electronic device defined in claim 15 wherein the depth sensor comprises an array of infrared emitters and an infrared camera.

17. The electronic device defined in claim 15 wherein the light sensor comprises an ambient light sensor configured to measure ambient light and wherein the color of the illumination is based on the measured color of the ambient light.

18. The electronic device defined in claim 15 further comprising:
    a camera configured to capture images of an environment; and
    control circuitry configured to process the images to identify an object in the environment.

19. The electronic device defined in claim 15 further comprising a voice-controlled internet-connected speaker.

* * * * *